July 24, 1923.
C. H. LISTER
RECIPROCATING CONVEYER SYSTEM
Filed Aug. 18, 1922
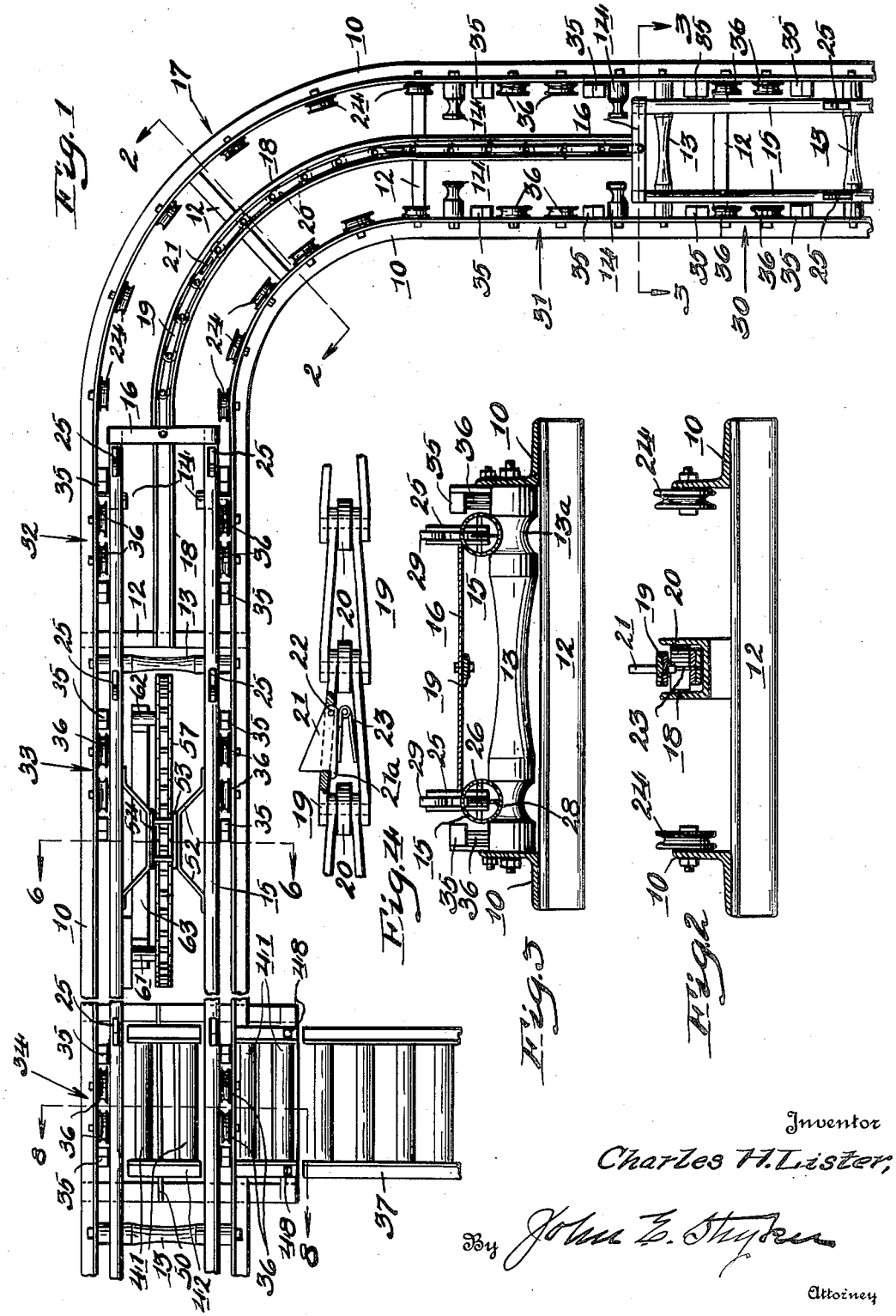
Inventor
Charles H. Lister,
By John E. Snyder
Attorney

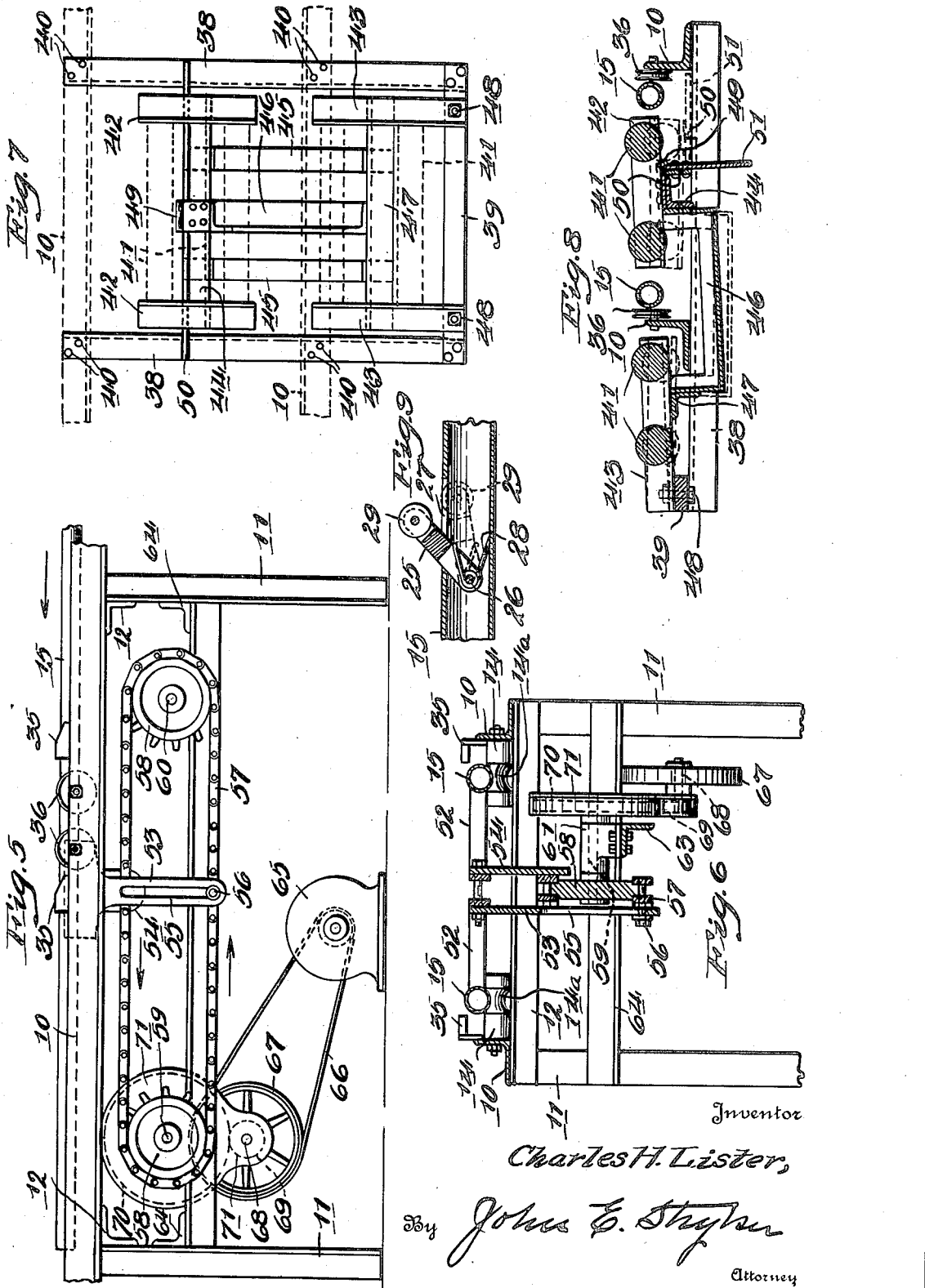

Patented July 24, 1923.

1,462,511

UNITED STATES PATENT OFFICE.

CHARLES H. LISTER, OF NORTH ST. PAUL, MINNESOTA.

RECIPROCATING CONVEYER SYSTEM.

Application filed August 18, 1922. Serial No. 582,653.

*To all whom it may concern:*

Be it known that I, CHARLES H. LISTER, a citizen of the United States, residing at North St. Paul, in the county of Ramsey and State of Minnesota, have invented new and useful Improvements in Reciprocating Conveyer Systems, of which the following is a specification.

It is my object to provide a novel and efficient conveyer system of the type wherein the packages or other objects to be transported are conveyed in step by step movement over a suitable track or guide rails.

A further object of my invention is to provide a power conveyer in which friction, and consequently the cost of operation and power expended, is reduced to a minimum.

A further object of my invention is to provide in a device of this kind novel and efficient means for diverting boxes, packages or the like from a main conveyer line to a branch conveyer line or to a station where the boxes are to be deposited.

A still further object of my invention is to provide a reciprocating conveyer with novel means for engaging without injuring the packages to be conveyed.

Other objects of my invention will appear and be more fully pointed out in the following specification and claims.

The accompanying drawings illustrate what I at present believe to be the best form of my device.

In the drawings Figure 1 is a plan view of my improved conveyer system; Fig. 2 is a section taken on the line 2—2 of Fig. 1; Fig. 3 is a section taken on the line 3—3 of Fig. 1; Fig. 4 is a detail side elevation of a portion of the chain which moves the packages around a horizontal curve in the conveyer; Fig. 5 is a side elevation showing the mechanism for producing reciprocating movement; Fig. 6 is a section through the same taken on the line 6—6 of Fig. 1; Fig. 7 is a detail plan view of the diverter frame with the rollers removed to show parts otherwise concealed; Fig. 8 is a section through the diverter taken on the line 8—8 of Fig. 1 and Fig. 9 is a central vertical section through a portion of one of the tubular carriers showing one of the spring actuated arms for engaging packages on the conveyer.

My improved conveyer system, which is preferably mounted in a substantially horizontal plane, consists of a pair of side rails 10 supported upon legs 11, and means for advancing packages or the like in step by step movement along the rails 10; said rails being joined at suitable intervals by transverse frame members 12. The rails 10, legs 11 and transverse member 12 are preferably made of angle irons. Journalled between the rails 10 is a series of rollers 13 and 14 which are severally formed with annular grooves 13$^a$ and 14$^a$, respectively, which form guide ways for tubular carriers 15. These carriers 15 are held in spaced parallel relation in the grooves 13$^a$ and 14$^a$ by transverse bars 16.

Midway between the side rails 10 in a horizontally curved portion 17 thereof is a guide channel 18 for a carrier chain 19. This chain is pivotally joined at its ends to the transverse bars 16 on the tubular carriers 15. At each of the link joints of the chain 19 a roller 20 is provided.

These rollers 20 are revoluble in a horizontal plane and arranged to bear upon the vertical walls of the channel 18. At spaced intervals in the chain 19 are lugs 21 which are pivoted on pins 22 in said chain and supported by springs 23 so as to normally project from the upper surface of the chain. A series of anti-friction wheels 24 are mounted on the rails 10 around the curve 17 to support packages when conveyed thereon.

Spring actuated arms 25 are mounted in pairs and at suitable intervals in the carriers 15. These arms 25 are pivotally joined to the tubes by pins 26 and are normally held so as to project from slots 27 in said tubes by springs 28. A roller 29 is journalled between the bifurcated upper ends of each of the arms 25 to engage packages on the conveyer as hereinafter described.

A plurality of spaced rest stations 30, 31, 32, 33 and 34 are mounted on the side rails 10 and each of said stations consists of two pairs of stationary, beveled lugs 35 (one pair on each side rail 10) between which are journalled two pairs of anti-friction wheels 36. As clearly shown in Figs. 3, 5 and 6, the lugs 35 and upper peripheries of the wheels 36 of each station are arranged in approximately the same horizontal plane and said lugs and wheels extend a short distance above the tubular carriers 15. Thus, the rest stations 30, 31, 32, 33 and 34 are raised so that packages on said stations are held free from the carriers 15.

A diverter, for removing packages from the main conveyer line above described to a branch conveyer 37, is illustrated in Figs. 1, 7 and 8. This diverter is supported on a stationary frame consisting of longitudinal members 38 and a transverse member 39. The longitudinal members 38 are rigidly fastened to the lower surface of the side rails 10 by suitable bolts or rivets in holes 40 (Fig. 7). A series or bed of rollers 41, journalled between angle irons 42 and 43, are arranged to be tilted or raised to project above the station 34. As clearly shown in Figs. 7 and 8 the angle bars 42 are held in parallel relation by a transverse angle bar 44, and the latter bar is connected, by longitudinal bars 45 and 46, with a second transverse angle bar 47 joining the bars 43. The ends of the latter bars are tiltably connected to the transverse member 39 of the frame by loose bolts 48. Pivotally connected by a hinge 49 to the transverse bar 44 is a plate 50 which projects over the upper surfaces of the longitudinal frame members 38 so as to support the adjacent or free end of the bed of rollers 41. This plate is provided with a handle 51 (Fig. 8) which is manipulated to pivot the plate 50 from horizontal to vertical position or vice versa and thereby raise or lower the bars 42 and 43 carrying the rollers 41. To clear the adjacent side rail 10, the longitudinal members 45 and 46 are bent downward as shown in Fig. 8 and then upward to the transverse member 44.

Reciprocating movement is produced by the following described mechanism illustrated in Figs. 1, 5 and 6. The tubular carriers 15 are connected by brackets 52 to a downwardly projecting arm or scotch yoke 53 and also to a parallel supporting arm 54. A vertical slot 55 in the yoke 53 is provided to receive a pin 56 which joins said yoke to an endless chain 57 carried by sprockets 58. Said sprockets 58 are fast on shafts 59 and 60 which are journalled in bearings 61 and 62 supported on a longitudinal angle iron 63. This angle iron is secured to the lower surface of transverse frame members 64 which in turn are fastened to the legs 11. The shaft 59 is adapted to be driven through suitable gearing from a motor 65. This gearing consists of a belt 66 driving a pulley 67 on a shaft 68 and gears 69 and 70, connecting the latter shaft with the shaft 59 in a suitable gear housing 71.

Operation.

In operation the chain 57 is continually driven by the motor 65 in the direction indicated by arrows in Fig. 5. This, as will be readily understood, imparts reciprocating movement to the tubular carriers 15 by means of the yoke 53. The length of the stroke thus imparted is equal to the distance between adjacent rest stations on the rails 10 and also is equal to the distance between adjacent lugs 21 on the chain 19 and pairs of arms 25 on the tubular carriers 15. Now, assuming that a box or package to be conveyed is placed or delivered to the rest station 30 and the yoke 53 is starting on its forward or power stroke (from left to right in Fig. 5), the arms 25 on the carrier 15 will project and engage the rearward, lower edge of the box or package on the station 30 and will push the same forward off said rest station. The package will be carried forward on the upper surface of the carriers 15, (said carriers being supported by and freely movable on the rollers 13 and 14,) and then said package will be pushed upon the beveled lugs 35 and wheels 36 of the rest station 31. The carriers 15 are now reversed leaving the package on the station 31. During this reverse movement the package is supported above the carriers 15 so that said carriers move freely beneath the package. Upon the succeeding forward stroke of the carrier the first lug 21 on the chain 19 engages the back of the package on the station 31 and pushes the same forward upon the anti-friction wheels 24. No raised rest stations are provided on the curved portion 17 of the conveyor, because the packages are supported above the chain 19 by the wheels 24. Upon the succeeding reverse movement of the chain 19 the lug 21 in front of the package just advanced is depressed, against the action of the spring 23, by contact with the package and passes beneath the package. Upon the following forward stroke the lug 21 will securely engage and push the package forward. Thus, it will be readily understood, as the reciprocating movement of the chain 19 and carriers 15 continues the package on the curved portion 17 will be advanced step by step to the station 32 on the straight portion of the rails 10. From the latter station the package will be moved as described above until it reaches the station 34.

During the above described movement from the station 30 to the station 34, the wheels 36 reduce the friction of the movement from the first pair of lugs 35 to the second pair of said lugs on each station and also support and guide the packages.

From this station 34 the package is either carried forward on the main conveyer or it may be diverted to the conveyer 37 as follows: To divert the package on the station 34, the bed of rollers 41 is raised by moving the lever 51 from horizontal to substantially vertical position shown in Fig. 8. Thus, the rollers 41 are raised above the station 34 and the package moves by gravity over said rollers to the conveyer 37. This latter conveyer is of the usual type consisting of side rails supporting a bed of rollers upon which the packages to be conveyed are supported. If it is desired to divert succeeding packages from the main conveyer the rollers 41 are allowed to remain in elevated position shown in Fig. 8, but if it is desired to have the diverter remain inoperative said rollers are again depressed to the position shown in dotted lines in Fig. 8 by raising the lever 51 to horizontal position.

Having described my invention what I claim as new and desire to protect by Letters Patent is:

1. In a reciprocating conveyer, parallel side rails, rollers mounted on said rails, rigid carriers supported on said rollers, said carriers being arranged to receive packages to be conveyed on their upper surfaces, elevated rest stations arranged at intervals on said rails to freely support packages above said carriers, means projecting from said carriers to engage packages on said rest stations, and means for imparting reciprocating movement to said carriers and thereby advance packages in step by step movement from one of said rest stations to another.

2. In a reciprocating conveyer, parallel side rails, grooved rollers mounted on said rails, rigid tubular carriers supported on said rollers and guided by the grooves therein, said carriers being arranged to receive packages to be conveyed on their upper surfaces, elevated rest stations arranged at intervals on said rails to freely support packages above said carriers, means projecting from said carriers to engage packages on said rest stations, and means for imparting reciprocating movement to said carriers and thereby advance packages in step by step movement from one of said rest stations to another.

3. In a reciprocating conveyer, parallel side rails, rollers mounted on said rails, rigid carriers supported on said rollers, said carriers being arranged to receive packages to be conveyed on their upper surfaces, elevated rest stations mounted at intervals on said rails to freely support packages above said carriers, pairs of arms projecting from said carriers, rollers mounted in said arms to engage packages on said rest stations, and means for imparting reciprocating movement to said carriers and thereby advance packages in step by step movement from one of said rest stations to another.

4. In a reciprocating conveyer, a pair of parallel side rails arranged in substantially horizontal position, rollers mounted on said rails, and extending from one of said rails to the other, rigid carriers supported on said rollers, said carriers being arranged to receive packages to be conveyed on their upper surfaces, elevated rest stations mounted at intervals on said rails to freely support packages above said carriers, means projecting from said carriers adapted to engage packages on said carriers and rest stations, and means for imparting reciprocating movement to said carriers and thereby advance packages in step by step movement from one of said rest stations to another.

5. In a reciprocating conveyer, parallel side rails, rollers mounted on said rails, rigid carriers supported on said rollers between said rails, said carriers being arranged to receive packages to be conveyed on their upper surfaces, elevated rest stations arranged at intervals on said rails to freely support packages above said carriers, said stations consisting of pairs of stationary lugs, and anti-friction wheels mounted adjacent to said lugs on said rails, means projecting from said carriers adapted to engage packages on said rest stations, and means for imparting reciprocating movement to said carriers and thereby advance packages in step by step movement from one of said rest stations to another.

6. In a reciprocating conveyer, parallel side rails arranged in rectilinear and curved sections, rollers mounted on the rectilinear sections of said rails, rigid carriers supported on said rollers, a chain carrier between the curved portions of said rails and connected to said rigid carriers, and means for imparting reciprocating movement to said rigid and chain carries.

7. In a reciprocating conveyer, parallel side rails arranged in rectilinear and curved sections, rollers mounted on the rectilinear sections of said rails, rigid carriers supported on said rollers between the rectilinear portions of said rails, a guide channel between the curved portions of said rails, a chain carrier in said channel and connected to said rigid carriers, and means for imparting reciprocating movement to said rigid and chain carriers.

8. In a reciprocating conveyer, parallel side rails arranged in rectilinear and curved sections, grooved rollers mounted on the rectilinear sections of said rails, rigid carriers supported in the grooves in said rollers, a chain carrier between the curved sections of said rails and connected to said rigid carriers, means projecting from said rigid and chain carriers to engage packages to be conveyed, and means for imparting reciprocating movement to said rigid and chain carriers.

9. In a reciprocating conveyer, parallel side rails, elevated and spaced rest stations mounted on said rails, carriers adapted to be given reciprocating movement between said rails and arranged to support packages to be conveyed, means mounted on said carriers for engaging the packages, means for imparting reciprocating movement to said carriers whereby said packages are advanced in step by step movement from one of said rest stations to another, a bed of rollers supported beneath one of said rest stations and arranged at an angle with said side rails, and means for raising said bed above said last mentioned station to divert packages from said station.

10. In a reciprocating conveyer, parallel side rails arranged in substantially horizontal position, elevated and spaced rest stations mounted on said rails, carriers adapted to be given reciprocating movement between said rails and arranged to support packages to be conveyed, means mounted on said carriers for engaging the packages, means for imparting reciprocating movement to said carriers whereby said packages are adavnced in step by step movement from one of said rest stations to another, a bed of rollers tiltably supported beneath one of said rest stations and arranged at an angle with said side rails, and means for raising said bed above said last mentioned station and thereby divert packages from said station and carriers.

11. In a device of the class described the combination of a conveyer having side rails and a rest station for packages on said rails, a stationary frame mounted beneath said rails, a movable frame supported on said stationary frame, a diverter roller mounted in said movable frame between said rails, and means for raising said last mentioned frame and thereby cause said roller to divert packages from said station.

12. In a device of the class described the combination of a conveyer having side rails and a rest station for packages on said rails, a stationary frame mounted beneath said rails, a bed of diverter rollers tiltably supported on said stationary frame, and extending between said rails, and means for raising said bed above said station and thereby cause said roller to divert packages from said station.

In testimony whereof, I have hereunto signed my name to this specification.

CHARLES H. LISTER.